US008495421B2

(12) United States Patent
Glaeser et al.

(10) Patent No.: US 8,495,421 B2
(45) Date of Patent: Jul. 23, 2013

(54) METHOD FOR PACKET-SWITCHING TRANSMISSION OF MEDIA DATA AND DEVICE FOR PROCESSING MEDIA DATA WITH INSERTION OF ERROR INFORMATION DATA

(75) Inventors: Frank Glaeser, Hannover (DE); Andreas Matthias Aust, Hannover (DE)

(73) Assignee: Thomson Licensing, Issy-les-Moulineaux (FR)

( * ) Notice: Subject to any disclaimer, the term of this patent is extended or adjusted under 35 U.S.C. 154(b) by 1037 days.

(21) Appl. No.: 12/449,014

(22) PCT Filed: Jan. 24, 2008

(86) PCT No.: PCT/EP2008/050817
§ 371 (c)(1),
(2), (4) Date: Jul. 20, 2009

(87) PCT Pub. No.: WO2008/090199
PCT Pub. Date: Jul. 31, 2008

(65) Prior Publication Data
US 2010/0115384 A1    May 6, 2010

(30) Foreign Application Priority Data

Jan. 26, 2007   (DE) .......................... 10 2007 004 951

(51) Int. Cl.
*G06F 11/00* (2006.01)
*G06F 11/14* (2006.01)
(52) U.S. Cl.
USPC ................... 714/18; 714/15; 714/43; 709/230
(58) Field of Classification Search
USPC .............. 714/18, 43; 709/230, 231, 232, 234, 709/246
See application file for complete search history.

(56) References Cited

U.S. PATENT DOCUMENTS 5,754,754 A * 5/1998 Dudley et al. ................... 714/18
6,944,161 B2 * 9/2005 Sandell ...................... 370/395.1
(Continued)

FOREIGN PATENT DOCUMENTS

EP        0969673       1/2000
EP        1333625       8/2003
(Continued)

OTHER PUBLICATIONS

Aust (EP 2040434 A1) "Method for Transferring High Resolution Multimedia Data in a High Speed Network, Server Apparatus and Client Apparatus for Use in the Method" Published Mar. 26, 2009.*
(Continued)

*Primary Examiner* — Joseph Schell
(74) *Attorney, Agent, or Firm* — Myers Wolin, LLC

(57) ABSTRACT

The invention relates to a method for packet-switching transmission of media data and a device for processing media data. Media data may be video, audio or text data, or other data. Transmission of the data is usually effected according to a streaming method. The data is therein transmitted in packets and re-assembled in the receiving device. For Internet applications, the real-time transport protocol is very widely used in the transmission of data streams. However, this data transmission protocol does not enable a secure transmission which is based on a repetition of the defectively transmitted data. Sequence counters are used according to this protocol so that left-out data packets can be detected in the receiving device. According to the invention, it is provided that error information data is inserted in the destination media data record which is generated from the received data in the receiving device when, according to the transmission protocol, transmission errors are detected in the analysis of the data packets received. The transmission errors are then documented in the destination data record. The stored error information can be analyzed upon reproduction of the destination data record so that it can be evaluated, in particular, whether the recorded original data is so seriously defective that a new recording is inevitable. In particular, this is advantageous in video production where it is necessary to quickly evaluate whether a recorded film or video scene is of acceptable quality (if necessary, taking potential retouching into account) or whether it must be repeated and recorded again.

8 Claims, 1 Drawing Sheet

U.S. PATENT DOCUMENTS

| | | |
|---|---|---|
| 6,959,020 B1 | 10/2005 | Hourunranta et al. |
| 6,988,238 B1 | 1/2006 | Kovacevic et al. |
| 6,996,623 B1 | 2/2006 | Kaeano et al. |
| 7,415,528 B2 * | 8/2008 | Choi et al. .................... 709/231 |
| 7,444,360 B2 * | 10/2008 | Frondozo et al. ..................... 1/1 |
| 2001/0001002 A1 | 5/2001 | Sugawara et al. |
| 2002/0026614 A1 | 2/2002 | Park et al. |
| 2003/0014705 A1 | 1/2003 | Suzuki et al. |
| 2004/0013121 A1 | 1/2004 | Higashigawa et al. |
| 2004/0199463 A1 | 10/2004 | Deggendorf |
| 2006/0112272 A1 * | 5/2006 | Morioka et al. ............. 713/171 |
| 2006/0156198 A1 | 7/2006 | Boyce et al. |
| 2007/0220222 A1 * | 9/2007 | Boldt et al. ................... 711/162 |
| 2009/0019307 A1 * | 1/2009 | Kwon ............................. 714/16 |
| 2010/0189256 A1 * | 7/2010 | Doehla et al. ................. 380/217 |

FOREIGN PATENT DOCUMENTS

| | | |
|---|---|---|
| JP | 2000115104 | 4/2000 |
| JP | 2001148837 | 5/2001 |
| JP | 200456393 | 2/2004 |
| JP | 2004537911 | 12/2004 |
| WO | WO03013004 | 2/2003 |
| WO | WO2006123751 | 11/2006 |

OTHER PUBLICATIONS

Search Report Dated May 27, 2008.

* cited by examiner

METHOD FOR PACKET-SWITCHING TRANSMISSION OF MEDIA DATA AND DEVICE FOR PROCESSING MEDIA DATA WITH INSERTION OF ERROR INFORMATION DATA

This application claims the benefit, under 35 U.S.C. §365 of International Application PCT/EP2008/050817, filed Jan. 24, 2008, which was published in accordance with PCT Article 21(2) on Jul. 31, 2008 in English and which claims the benefit of German patent application No. 102007004951.1, filed Jan. 26, 2007.

The invention relates to technologies in the field of processing media data, in particular video data.

PRIOR ART

Media data such as video, audio or text data can be processed in different ways. This includes, for example, creating video data by means of a recording device, for example, a camera or a scanner. Processing video data furthermore includes its storage on a suitable storage medium or also the transmission of video data between two facilities which can process video data. Thus, video data usually generated with a recording device is transmitted to a storage medium to store it there for further processing. Such a method is used, in particular, in the commercial area where, after a film scene is recorded with a camera, the thus generated video data is transmitted to a storage medium via a data communication connection. Since large volumes of data must here be transmitted at a high data rate, the 10 Gbit Ethernet is currently used as the preferred transmission medium.

Transmission of the video data is usually effected according to a streaming method. Such a method is characterized in that an output video data record is broken down according to an algorithm specified by the streaming protocol used for the transmission to be subsequently transmitted, in its broken down condition, from the sending device to the receiving device according to the streaming protocol. The output video data record is here divided into data packets in accordance with the streaming protocol. Subsequently, the data packets thus produced are transmitted via the data communication connection between the sending device and the receiving device. In the receiving device, the data packets received are then combined to a destination video data record.

The Real-time Transport Protocol (RTP) is a streaming protocol which can be used for the transmission of video data. However, the transmission of video data thus effected is not a safe data transmission since RTP does not provide, for example, any repeat transmission of data packets which have been lost. Based on a sequence counter, RTP can only indicate that a data packet has not been received on the part of the receiving device. Although network engineering can provide shielding measures for the data communication connection between the sending device and the receiving device so that a loss of data packets due to a network overload because of other additional data streams can be excluded, a loss of data packets in the data communication connection cannot be excluded. Such losses can occur, for example, due to defects in a physical layer of the data communication connection. For filmed movie scenes with a transmission error occurring in their subsequent transmission, it means that the movie scene must once again be completely filmed since the transmission protocol merely indicates the existence of a transmission error. In professional applications in particular, the repeat filming frequently entails high expenditures—for example, in case of elaborate action scenes; or it is even impossible to repeat the filming.

INVENTION

It is the objective of the invention to provide an improved method for packet-switching transmission of media data, as well as a device for processing media data which is adapted for use with the application, and which both ensure a more user-friendly handling of transmission errors.

According to the invention, this problem is solved by a method for packet-switching transmission of media data according to the independent claim 1, as well as a device, adapted for use with the method, for processing media data according to the independent claim 10.

The invention comprises the concept of transmitting—in a method for packet-switching transmission of media data between a sending device and a receiving device—an output media data record in the form of data packets from the sending device via a data communication connection to a receiving device according to a transmission protocol, and of generating a destination media data record from the transmitted data packets, wherein error information data is inserted in the destination media data record if transmission errors are detected upon the transmission of the data packets according to the transmission protocol. Transmission errors are thus documented in the destination media data record. Together with the actual media data, information is available on its possible defectiveness. The error information is available at the time of storage of the destination media data record.

In particular with the transmission of media data at high data rates—as is the case, for example, with the current 10 Gbit Ethernet where special data safety measures cannot be sensibly implemented at all—the proposed art provides a possibility of analyzing transmission errors application-specifically and flexibly and then arrange for suitable measures, for example, a data correction.

According to another aspect of the invention, a device is created for processing media data which is adapted for use with a method according to the invention, with a receiving unit configured to receive data packets which are transmitted to the receiving unit according to a transmission protocol via a data communication connection, and with a data processing unit configured to create a destination media data record from the data packets received and to insert error information data into the destination media data record if transmission errors are detected upon the transmission of the data packets.

A preferred further development of the invention provides that the error information data is derived from an error message of the transmission protocol. The derivation of error information data from an error message of the transmission protocol used for the transmission of the media data has the advantage that no additional error analysis functionality must be made available although this may be provided in another embodiment. The error message generated by the transmission protocol itself is merely analyzed.

An expedient embodiment of the invention may provide that the error information data is inserted as metadata into the destination media data record, optionally at least partially into a header data record of the destination media data record.

An advantageous embodiment of the invention provides that the error information data indicates at least one error information selected from the following group of error information: Loss information about the loss of one or a plurality of data packet(s), error number information, information about the data volume of missing media data, positional information about a position allocated to a defectively transmitted data packet in the destination media data record, and spacing information about a spacing between defectively transmitted data packets in positions allocated to the destination media data record. Depending on which information is available on transmission errors occurred which is either derived from error messages of the transmission protocol or from an additional error analysis or from a combination thereof, it can be integrated into the error information data. The different error information can be randomly combined depending on the case of application. A loss information about the loss of one or a plurality of data packet(s) shows in particular that specific data packets have been lost in transmission. It can also be provided to integrate an error number information into the error information data from which the number of transmission errors occurred can be derived, for example, a number of lost data packets. The information on the data volume of missing media data can provide, in particular, a measure of which relative share of media data to be transmitted has been lost. The positional information about a position allocated to a defectively transmitted data packet in the destination media data record shows at which point of the destination media data record a defective data record is arranged due to a transmission error. A spacing information about a spacing between defectively transmitted data packets in positions allocated to the destination media data record, the defective data areas in the destination media data record can be derived faster. Thus, individual defective data areas can be analyzed faster in the analysis of the destination media data record.

An embodiment of the invention preferably provides that, with a transmission error in the form of a data packet loss of at least one data packet, a data area in the destination media data record is left free which is allocated to the at least one data packet lost due to the data packet loss. When a data packet is lost during the data transmission, this embodiment provides to leave a data area free at that point where the lost data packet would have to be integrated into the destination media data record, and the data area can then be used, for example, to insert data which at least partially corrects the transmission error which occurred.

An advantageous embodiment of the invention can provide that the data area left free is formed according to a data volume of the at least one data packet lost by the data packet loss. Alternatively, the data area left free can be formed according to a percentage part of the complete volume of the lost data.

A further embodiment of the invention can provide that error information data allocated to the data packet loss is inserted in the data area left free in the destination media data record. The error information data allocated to the data packet loss can comprise different information characterizing the data packet loss, for example, the volume of the lost data. Also, additional error information—as detailed above—can be deposited at least partly in the data area allocated to the lost data packet.

A preferred development of the invention provides that—in the data area left free—offset error information data comprised by the allocated error information data is inserted, wherein the offset error information data indicates a spacing between the at least one data packet lost by the data packet loss and at least one additional data packet lost by the data packet loss in the destination media data record. The offset error information data refers, for example, to a spacing in the destination media data record to the directly following, defective data area which also resulted, for example, due to a data packet loss. Supplementarily or alternatively, the offset error information data can also indicate a spacing to one or a plurality of not directly following, defective data area(s).

An advantageous embodiment of the invention provides that at least the output media data record or at least the destination media data record is formed as a data record in DPX format. DPX stands for "Digital Moving Picture Exchange" and currently presents a widely used format for media data. Video, audio and text data can be provided and transmitted in this format. Characteristically, the DPX format also provides a header data record for the media data record.

DRAWING

The invention is hereinafter explained in more detail, on the basis of the exemplary embodiments with reference to the figures of a drawing. In the Figures.

EXEMPLARY EMBODIMENTS

Figure 1:
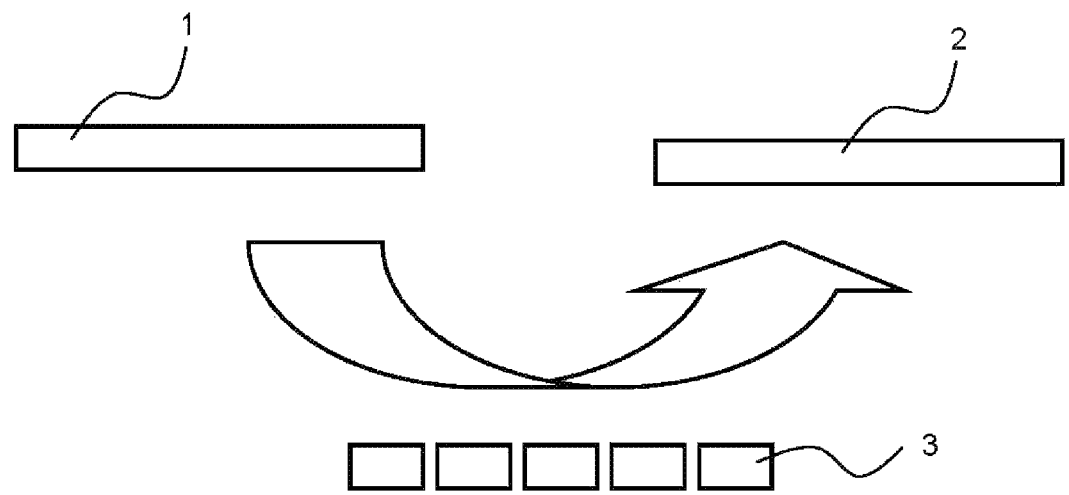
FIG. 1 shows a schematic presentation with an output media data record and a destination media data record.

FIG. 1 shows a schematic presentation for the explanation of a method for the transmission of media data which comprises video, audio and/or text data, from a sending device to a receiving device.

For example, data transmission is provided between a recording device such as a camera or a scanner and a storage device. The sending and the receiving device can be provided as server facilities in a network. The media data which is available, for example, as individual image files is transmitted at a high data rate, for example, by using a 10 Gbit Ethernet connection.

According to FIG. 1, an output media data record 1 is to be transmitted. For the purpose of the transmission, the output media data record 1 is divided into a plurality of data packets 3 which are then arranged and transmitted according to a transmission protocol used for the data transmission. The real-time transport protocol (RTP) can here be used, for example. In the receiving device, a destination media data record 2 is created from the transmitted data.

Now, transmission errors may occur in the transmission of the data packets 3 via a utilized data communication connection, for example the 10 Gbit Ethernet line; in particular, individual data packets can be lost. Such transmission errors can be indicated by the transmission protocol itself by means of an error message, or it can be provided to implement an error check method in the receiving device which detects transmission errors—detached from the transmission protocol or in combination therewith. When the destination media data record 2 is generated, error information data is integrated into it based on information about transmission errors.

Figure 2:
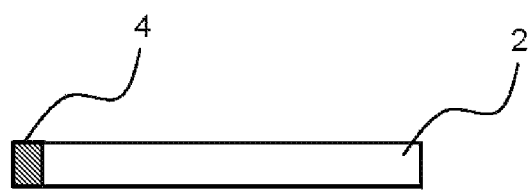
FIG. 2 shows a schematic presentation of a destination media data record with header data.
Figure 3:
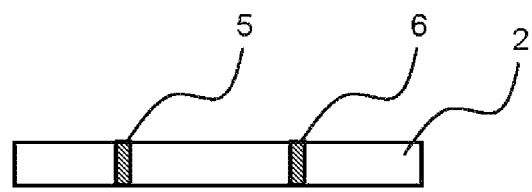
FIG. 3 shows a schematic presentation of the destination media data record, wherein error data information is arranged outside the header data.

FIGS. 2 and 3 are schematic presentations of the destination media data record 2 in different embodiments with regard to the insertion of error information data. According to the presentation in FIG. 2, the error information data is inserted as metadata into a header data record 4 of the destination media data record 2. When using the DPX format, the user-defined metadata can be written, for example, into the predefined field 76 according to the DPX format standard which is available for user-defined information.

FIG. 3 shows an alternative embodiment in which the error information data is written in two data areas 5, 6 which in turn correspond to a data area within the destination media data record 2 which is allocated to media data for which the associated data packets were defectively transmitted, and even a complete loss of the associated data packets may have occurred. In a potential embodiment, the data areas 5, 6 correspond in their corresponding scope to a data volume which would have been taken up by the associated media data if data packet losses had not occurred.

In an advantageous embodiment, the error information data integrated into the header data in accordance with FIG. 2 comprises information about a number of errors due to transmission errors in the destination media data record; a number of the media data missing due to the transmission errors; as well as a spacing of a first byte of the missing media data in relation to a reference byte, for example the first byte or the first bytes of the media data record 2. When a plurality of errors occurs due to transmission errors in the destination media data record 2, this embodiment can provide that the number of missing media data and a spacing to the next following data error stand in the position of the missing media data in the destination media data record 2. Preferably, a data field has a size of 16 bits for the number of errors; a data field for the number of the missing media data has a size of 16 bits as well; and a data field for an offset value concerning the spacing has a size of 32 bits.

By means of the stored error information data in the destination media data record 2, it is possible to find an error within the destination media data record very quickly. To even further accelerate the process of error finding for a total volume of a plurality of destination media data records—relating to a movie scene, for example—it may be provided to store information, in a suitable place, which contains a reference to the defective destination media data records. This may be done, for example, by means of an error information data record in the same directory in which the interrelated destination media data records are filed.

When a data packet is lost during the transmission of the data packets 3 between the sending device and the receiving device and it comprises data which belongs to the header data of the destination media data record, at least a partial reconstruction of the header data can be performed in the receiving device by analyzing the header data of one or a plurality of preceding destination media data records and/or one or a plurality of succeeding destination media data records. A reference information is then expediently inserted into the reconstructed header data record which shows that header data is concerned which is at least partially based on reconstructed data.

By means of the error information data in the destination media data record, a possibility is provided on the whole to quickly detect errors due to transmission errors as such and in their more precise expression. The person in charge can then decide whether the data error can be corrected by means of retouching or whether the media data must be produced again which, in connection with video data for example, requires that a movie scene must be filmed once again. In the decision about a correction of the transmission errors or the renewed generation of media data, cost/benefit considerations are in particular also possible based on the more detailed information about the error which occurred. The error information data provide at least basic clues in this respect.

The features of the invention disclosed in the above specification and in the claims can be of importance not only individually but also in any combination for the realization of the invention in its different embodiments.

The invention claimed is:

1. Method for packet-switching transmission of media data between a sending device and a receiving device, in which an output media data record is transmitted in the form of data packets from the sending device via a data communication connection to a receiving device according to a transmission protocol, and a destination media data record is generated from the transmitted data packets, wherein error information data is inserted in the destination media data record if transmission errors are detected upon the transmission of the data packets according to the transmission protocol, wherein, with a transmission error in the form of a data packet loss of at least one data packet, a data area in the destination media data record is left free which is allocated to the at least one data packet lost due to the data packet loss, and wherein, in the data area left free, offset error information data comprised by the allocated error information data is inserted, wherein the offset error information data indicates a spacing between the at least one data packet lost by the data packet loss and at least one additional data packet lost by the data packet loss in the destination media data record.

2. Method according to claim 1, wherein the error information data is derived from an error message of the transmission protocol.

3. Method according to claim 1, wherein the error information data is inserted as metadata into the destination media data record, optionally at least partially into a header data record of the destination media data record.

4. Method according to claim 1, wherein the error information data indicates at least one error information selected from the following group of error information: Loss information about the loss of one or a plurality of data packet(s), error number information, information about the data volume of missing media data, positional information about a position allocated to a defectively transmitted data packet in the destination media data record, and spacing information about a spacing between defectively transmitted data packets in positions allocated to the destination media data record.

5. Method according to claim 1, wherein the data area left free is formed according to a data volume of the at least one data packet lost by the data packet loss.

6. Method according to claim 1 wherein error information data allocated to the data packet loss is inserted in the data area left free in the destination media data record.

7. Method according to claim 1, wherein at least the output media data record or at least the destination media data record is formed as a data record in DPX format.

8. Device for processing non-transitory media data, comprising:

a receiver configured to receive data packets which are transmitted to the receiver according to a transmission protocol via a data communication connection, and a processor configured to create a destination media data record from the data packets received and to insert error information data into the destination media data record if transmission errors are detected upon the transmission of the data packets, wherein, with a transmission error in the form of a data packet loss of at least one data packet, a data area in the destination media data record is left free which is allocated to the at least one data packet lost due to the data packet loss, and wherein, in the data area left free, offset error information data comprised by the allocated error information data is inserted, wherein the offset error information data indicates a spacing between the at least one data packet lost by the data packet loss and at least one additional data packet lost by the data packet loss in the destination media data record.

* * * * *